US006996610B2

(12) United States Patent
Bantz et al.

(10) Patent No.: US 6,996,610 B2
(45) Date of Patent: Feb. 7, 2006

(54) DETERMINING LOCATION FOR A PORTABLE DATA PROCESSING SYSTEM BY ANALYZING LOCATION SYNDROMES

(75) Inventors: David Frederick Bantz, Chappaqua, NY (US); Thomas E. Chefalas, Somers, NY (US); Alexei A. Karve, Peekskill, NY (US); Steven J. Mastrianni, Unionville, CT (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 792 days.

(21) Appl. No.: 09/916,424

(22) Filed: Jul. 27, 2001

(65) Prior Publication Data

US 2003/0022673 A1    Jan. 30, 2003

(51) Int. Cl.
    *G06F 13/00* (2006.01)
(52) U.S. Cl. ...................................... 709/220
(58) Field of Classification Search ............... 342/450, 342/457; 701/1, 200, 207, 300; 709/217, 709/219, 220
    See application file for complete search history.

(56) References Cited

U.S. PATENT DOCUMENTS

| 5,557,748 A | * | 9/1996 | Norris ........................ 709/220 |
| 6,108,557 A | | 8/2000 | Wax et al. .................. 455/456 |
| 6,112,095 A | | 8/2000 | Wax et al. .................. 455/456 |

* cited by examiner

*Primary Examiner*—Robert B. Harrell
(74) *Attorney, Agent, or Firm*—Duke W. Yee; Gerald H. Glanzman

(57) ABSTRACT

A method, system, and computer program product for determining the location of a portable data processing system is provided. In one embodiment, the portable data processing system determines resources that are geographically proximate to the portable computer and generates a location syndrome. The location syndrome is then compared to a set of location profiles, wherein at least some of the location profiles correspond to different geographic locations. Responsive to sufficiently matching the location syndrome to one of the set of location profiles, a label corresponding to the matched one of the set of location profiles is returned as the current location of the portable data processing system.

30 Claims, 4 Drawing Sheets

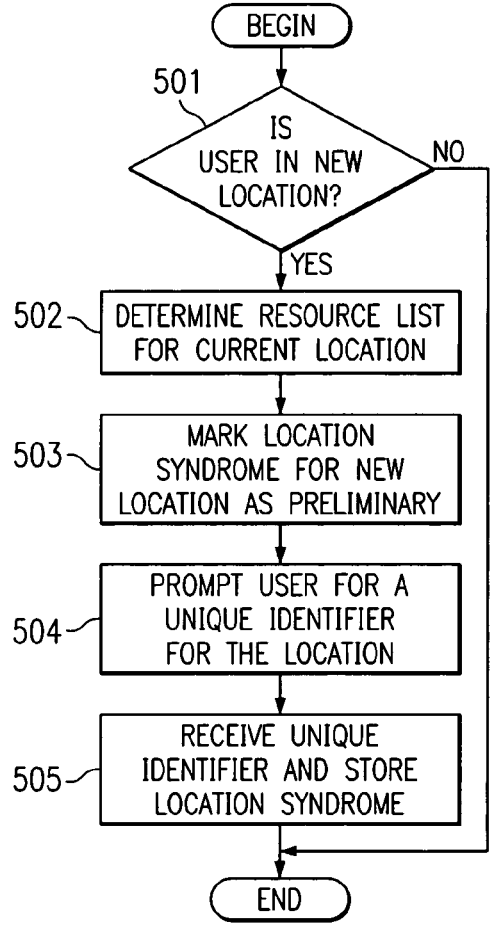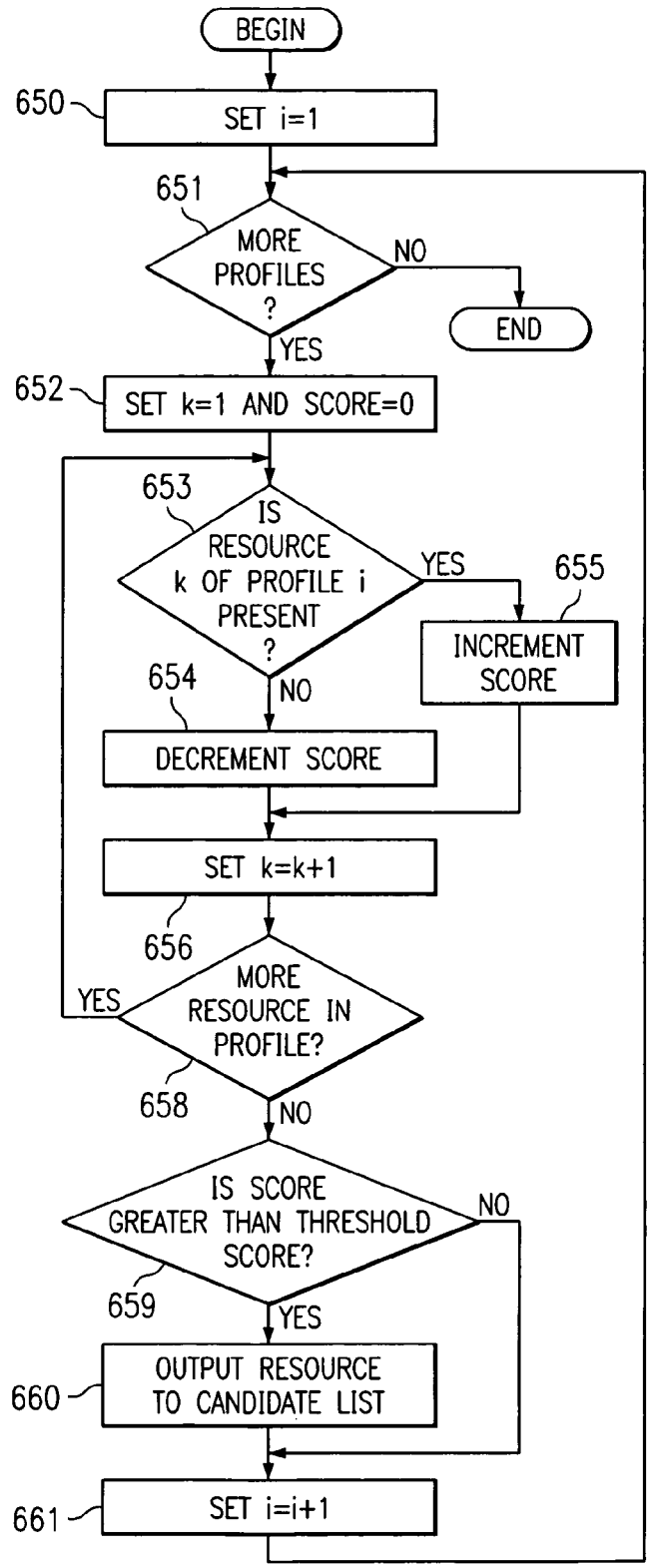

DETERMINING LOCATION FOR A PORTABLE DATA PROCESSING SYSTEM BY ANALYZING LOCATION SYNDROMES

BACKGROUND OF THE INVENTION

1. Technical Field

The present invention relates generally to computer software and, more particularly to location determination of a mobile client.

2. Description of Related Art

In mobile and portable computing, knowledge of the location of the computer is valuable: it permits customizing the behavior of the computer and its software in many valuable ways. For example, if the computer is equipped with an emergency button (e.g., "call 911"), the behavior of this button can be changed to call the closest emergency service provider. If there is an equipment configuration associated with each location, the behavior of the operating system of the computer can be changed so as only to show the local equipment (e.g., printer, scanner), thus simplifying the presentation and making it less confusing. Certain wide-area networking protocols (e.g., login) can be automated as well.

Many means are possible for determining the current location of the computer. A Global Positioning Satellite (GPS) receiver can determine its location by analysis of radio signals received from satellites. Dead-reckoning means (inertial guidance systems, such as gyroscopes and accelerometers) can give relative position from the last known good waypoint. The computer can even ask the user to select the current location via a graphical dialog. Each of these means has its advantages and drawbacks. GPS location takes power and does not work well in certain locations characterized by many reflected radio signals, or locations within buildings where radio signals from the satellites do not penetrate well. Dead-reckoning systems accumulate error over time until recalibrated at a waypoint. Both GPS and dead-reckoning systems require some weight and space for their implementation, and this may be disadvantageous to equipment portability. The alternative of asking the user to supply the current location may not work because the user may not know the current location, but, more importantly, the computer may not be attended by its user and therefore there will be no operator to have a dialog with.

Therefore, it would be desirable to have method and system for determining the location of a portable or mobile computer that requires less hardware than current systems.

SUMMARY OF THE INVENTION

The present invention provides a method, system, and computer program product for determining the location of a portable data processing system. In one embodiment, the portable data processing system determines resources that are geographically proximate to the portable computer and generates a location syndrome. The location syndrome is then compared to a set of location profiles, wherein at least some of the location profiles correspond to different geographic locations. Responsive to sufficiently matching the location syndrome to one of the set of location profiles, a label corresponding to the matched one of the set of location profiles is returned as the current location of the portable data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a process flow and program function for determination of a location syndrome in accordance with the present invention;

FIG. 6 depicts an exemplary process flow and program function for matching a location profile with resources available at a current location in accordance with the present invention;

DETAILED DESCRIPTION OF THE PREFERRED EMBODIMENT

Figure 1:
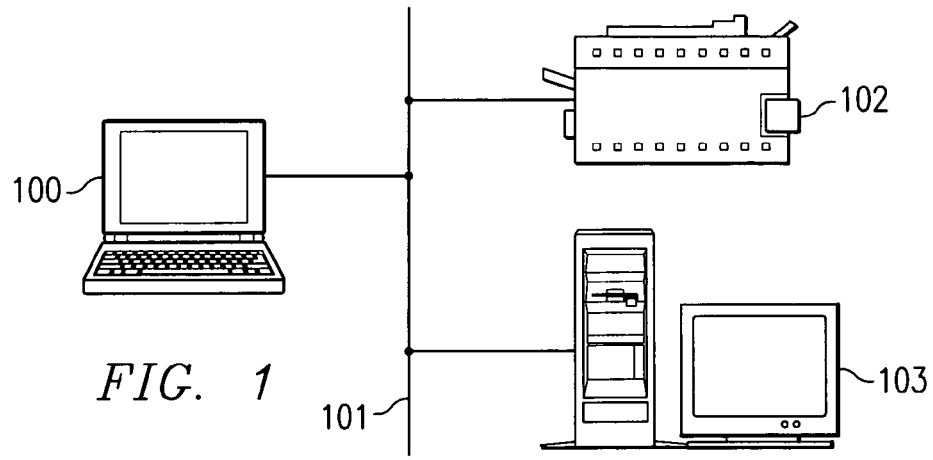
FIG. 1 depicts a pictorial diagram of a networked data processing system in accordance with the present invention.

With reference now to FIG. 1, a pictorial diagram of a networked data processing system is depicted in accordance with the present invention. As depicted, a portable computer 100, a portable data processing system, is connected to a local-area network (LAN) 101. Present on LAN 101 are two resources: a printer 102 and a server 103. When portable computer 100 is first attached to LAN 101, means (not shown, but well known in the art) discover the presence of network-attached resources 102 and 103. These discovery means may include, but are not limited to, the Dynamic Host Configuration Protocol (DHCP), which is a component of many implementations of the Transmission Control Protocol/Internet Protocol (TCP/IP) suite of communication protocols. In addition to DHCP, which is a directory-based protocol, the presence of network-attached resources 102 and 103 can be discovered using the Service Discovery Protocol (SDP) and Jini® which is a Java®-based resource-discovery system that is the product of Sun Microsystems, Inc. The LAN can be wireless in nature (e.g., IEEE 802.11 standard or Bluetooth® specification). The Bluetooth® wireless network has its own resource-discovery system. Regardless of the system used for resource discovery, portable computer 100 becomes aware of the set of its local network resources in some manner, wherein the set of resources comprises zero or more resources.

As an example, suppose the computer 100 connected to printer 102 and server 103 is in the user's office, and further suppose that there is no scanner in the office. The operating system can determine the presence and type of the printer and the presence of the server. This information forms a component of the location syndrome. If there is a stored profile labeled "office" that contains the type of printer 102 and server 103, then this profile will match the location syndrome, and the methods of the present invention will infer that the user is in his or her office rather than at his home.

In another example, suppose that there may be an identical printer to the printer at the office at the user's home, and a scanner as well. The home location syndrome contains both the printer and scanner. The present invention will then infer that the user is in his or her home if the location syndrome determines that a printer and scanner are present because the location syndrome will match the home profile exactly, while it will only partially match the office profile.

Thus, the present invention provides a method of determining a location that provides information that may then be used by other software within a portable computer to set configuration profiles to match components and resources available at the current location. For example, suppose that a user utilizes a proxy server to access the Internet at home. By discovering the location of the portable computer, the settings for the user's browser may be adjusted to reflect the proper settings without input from the user. This could be very beneficial in many circumstances in which the user may not remember the appropriate settings for each location.

Figure 2:
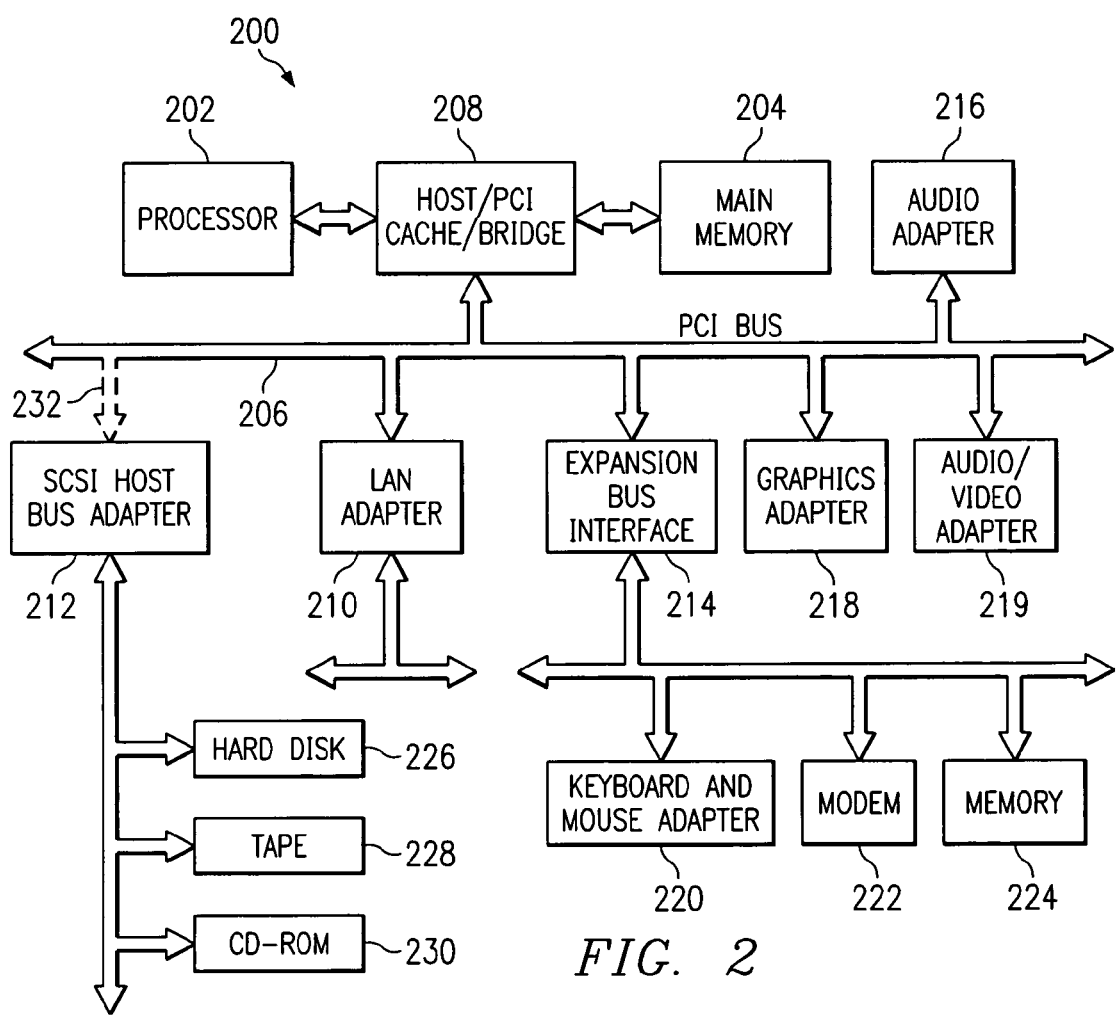
FIG. 2 depicts a block diagram of a data processing system in which the present invention may be implemented.

With reference now to FIG. 2, a block diagram of a data processing system is shown in which the present invention may be implemented. Data processing system 200 is an example of a computer, such as portable computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000®, which is available from Microsoft Corporation. An object oriented programming system such as Java® may run in conjunction with the operating system and provides calls to the operating system from Java® programs or applications executing on data processing system 200. "Java®" is a trademark of Sun Microsystems, Inc. Instructions for the operating system, the object-oriented programming system, and applications or programs are located on storage devices, such as hard disk drive 226, maybe loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figure 3:
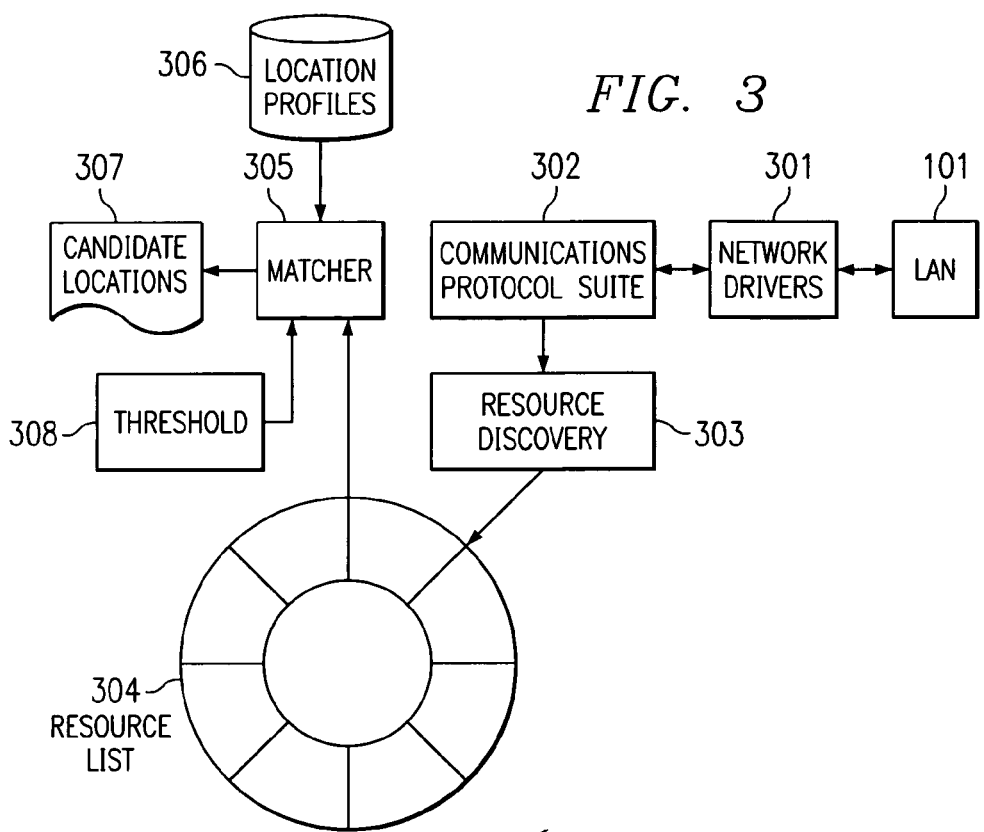
FIG. 3 depicts a block diagram of a location discovery component for use in a portable computer in accordance with the present invention.

With reference now to FIG. 3, a block diagram of a location discovery component for use in a portable computer, such as, for example, portable computer 100 in FIG. 1, is depicted in accordance with the present invention. LAN 101 is attached to computer 100 via network-interface hardware (not shown), controlled by network drivers 301. The communications protocol suite 302 uses these drivers to communicate with the network 101, and via the network 101 with network-attached resources. The resources discovery system 303 mentioned previously, uses the communication protocol suite 302 to discover the presence and identities of the network-attached resources and represents the list of such resources as resource list object 304.

Stored within portable computer 100 is a database of location profiles 306 whose contents will be described presently. Matcher 305 sequences through this database 306, matching each location profile with the resource list 304. The degree of match of each profile is determined, and those locations whose degree of match equals or exceeds threshold 308 are added to a sorted list of candidate locations 307.

Those of ordinary skill in the art will appreciate that the components in FIG. 3 may vary depending on the implementation. For example, in addition to resource list 304, a behavior list may also be included and the behavior of the network proximate to the portable data processing system determined and compared to behavior profiles in the behavior list. Behaviors stored in the behavior list are generally characteristics or attributes of the computing environment that can be sensed with appropriate software. The behaviors of interest are those which vary with the location of the computer. In some embodiments, the behavior list may be incorporated into the resource list such that a location profile contains both resources and behaviors characteristic of a location. Examples of a determinable behaviors include, but are not limited to, the current speed of the LAN (which in the case of Ethernet, typically varies from 10 to 100 or even 1000 Mbit/second) and also to who the current user of the portable computer is communicating.

Figure 4:
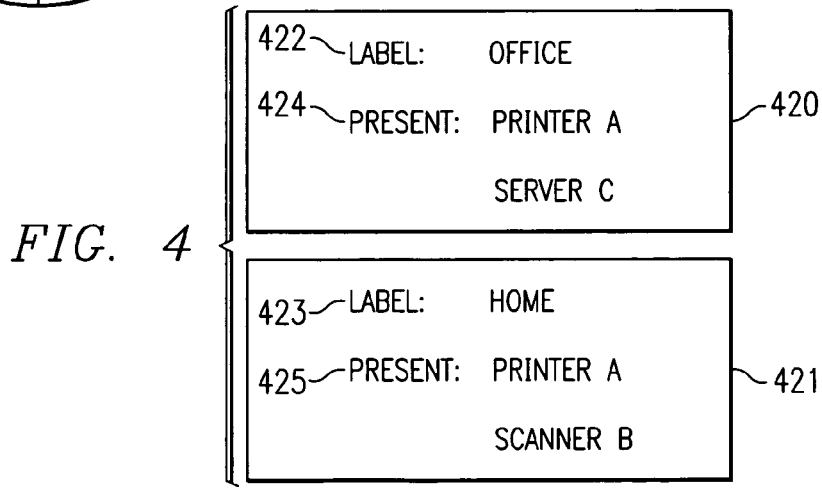
FIG. 4 depicts a block diagram illustrating a textual representation of two location profiles in accordance with the present invention.

With reference now to FIG. 4, a block diagram illustrating a textual representation of two location profiles is depicted in accordance with the present invention. Each of location profiles 420 and 421 has a label field 422–423 with a textual name of a location. Each of location profiles 420 and 421 also has a list of resources 424–425 that are normally present at that location. In profile 420, resources printer A and server C are normally present, while in profile 421, printer A and scanner B are normally present.

With reference now to FIG. 5, a process flow and program function for determination of a location syndrome is depicted in accordance with the present invention. The initial discovery of a location syndrome is performed by the resource discovery subsystem 303. If it is determined that a user is in a location not previously visited (step 501), then resource discovery determines a resource list 304 for the current location (step 502). This resource list is the initial location syndrome for that location and can be stored in the location profile database 306. Preferably, the initial location syndrome is marked as "preliminary" in that database (step 503) to indicate that it is the result of the very first sample of the resource profile of the location. In any case, a user dialog is presented asking the user to provide a unique identifier for the location (e.g., Albert's House) (step 504). This dialog may have an option (e.g., a button labeled "Advanced") that causes the location syndrome to be displayed to the user with editing capability. The user can then delete or add resources based on his or her observations of resources in the vicinity. The unique identifier is then received from the user and stored in the location syndrome (step 505).

Figure 8:
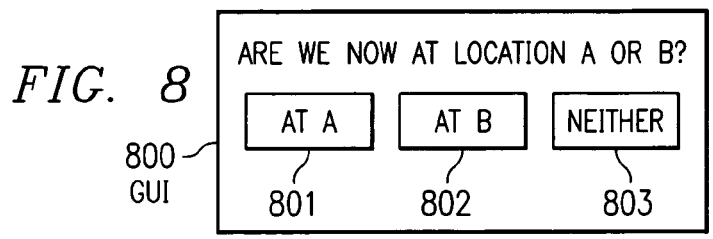
FIG. 8 depicts a block diagram illustrating an exemplary graphical user interface (GUI) for presenting a user with location choices in accordance with the present invention.

Location profiles marked "preliminary" are used for syndrome matching in the same way as other profiles not so marked. When a resource list precisely matches a location profile marked "preliminary," the marking is then removed. Alternatively, it may be decided that the preliminary marking is to be removed only after five exact matches, or some other number. If a location profile marked "preliminary" results in a user query as shown in FIG. 8, as discussed in more detail below, then its status as preliminary may be extended (e.g., no matter how many exact matches have occurred, the number of exact matches required is reset to the maximum value). Thus, if it always results in such a user query, then the profile's validity is in doubt and further user interaction to refine the location profile is required.

With reference now to FIG. 6, an exemplary process flow and program function for matching a location profile with resources available at a current location is depicted in accordance with the present invention. To begin, an index variable, i, that selects among profiles is initialized to one (step 650). Next, a test is made to determine if there are more (i.e. at least i) profiles (step 651). If there are at least i profiles, then an index variable k that selects among resources in the resource list object 304 is initialized to one and a score variable is initialized to zero (step 652). A higher score variable indicates a better match between the resources found at a location and a specific resource profile. Next, a test is performed to determine if resource k is present in profile i (step 653). If so, the score is incremented (step 655) and if not, the score is decremented (step 654). In either case, the resource index k is then incremented (step 656) and a test made to determine if there are more (i.e. at least k) resources listed in profile i (step 658). If there are more resources, then block 653 is entered, if not, then a test is made to determine whether the score is greater than a threshold score (step 659). If the threshold 308 is exceeded by the current score, an entry is placed for profile i in the candidate locations list 307. Once the resource has been added to the candidate locations list 307, the profile index, i, is incremented (step 661) and block 651 is entered.

If, after the matching process, the list of candidate locations 307 is empty, the location-determination process has failed and no indication of current location is available for further use. If the list of candidate locations 307 contains just one entry, as would often be the case, this entry is taken as the current location, provided that the degree of match is sufficient. If the list of candidate locations 307 contains more than one entry, then the degree of match of each entry in the list is further analyzed.

Figure 7:
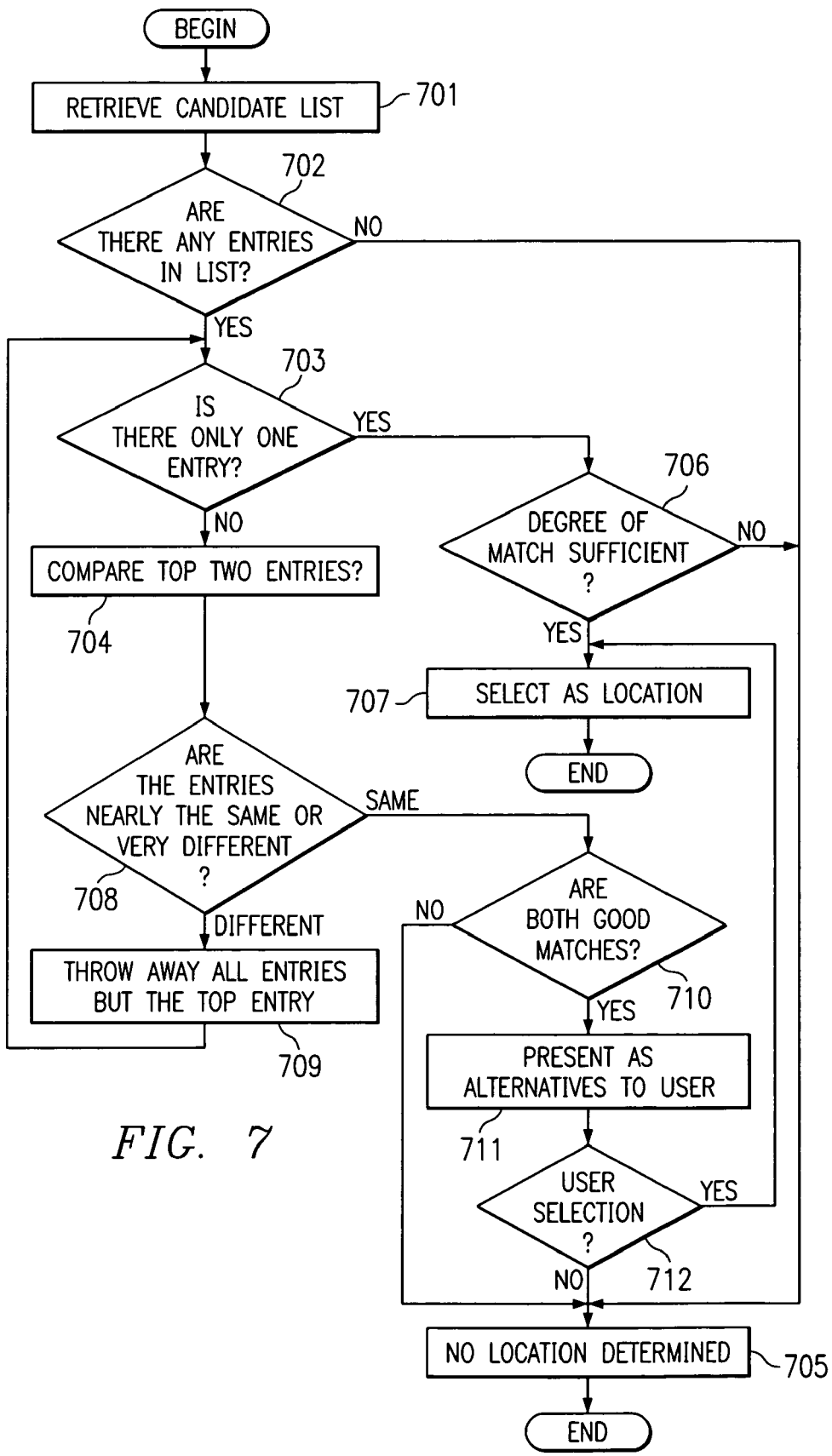
FIG. 7 depicts an exemplary process flow and program function for selection of a candidate location as the current location in accordance with the present invention.

With reference now to FIG. 7, an exemplary process flow and program function for selection of a candidate location as the current location is depicted in accordance with the present invention. To begin, the candidate location list 307 is retrieved (step 701) and a test is made to determine whether there are any entries on the candidate location list 307 (step 702). If none, then a indication of "no location determined" is returned to other software (step 705). Otherwise, a test is performed to determine if there is exactly one entry on the candidate location list 307 (step 703). If so, the degree of match of that entry is tested to determine if it is sufficient (step 706). If the degree is sufficient, then the label corresponding to the entry is selected and returned as the user's current determined location (step 707). If not sufficient, then an indication of "no location determined" is returned (step 705).

If there is more than one entry in the candidate location list 307, then the top two entries are compared (step 704) and a test is made to determine if the entries are nearly the same or very different (step 708). If the entries are very different, then all entries are deleted except for the top entry (i.e. best match) on the candidate location list 307. Block 703 is entered. If, on the other hand, both of the two best matches are similar in match value, then a test is made to determine whether both of the entries are good matches (step 710). If both of the best matches have poor match values, then block 705 is entered indicating that no location has been determined.

If, however, both of the best matches are close and are good matches, then both alternatives are presented to the user via, for example, a graphical user interface (step 711). A test is then made to determine if one of the matches has been selected by the user (step 712). If a user selects one of the candidates, then box 707 is entered indicting the returning of the determined location as the location selected by the user. If the user does not select either of the two candidates, but instead indicates that neither candidate is the correct location, then box 705 is entered indicating that no location has been determined.

With reference now to FIG. 8, a block diagram illustrating an exemplary graphical user interface (GUI) for presenting a user with location choices is depicted in accordance with the present invention. Dialog box 800 presents a query to the user and solicits input via buttons 801–803. In practice, the labels A and B would be replaced by the labels of the two locations whose profiles best matched the resource list 304. If the user selects button 801 or button 802, then block 707 is entered with the label of the selected location. If the user selects button 803, then block 705 is entered indicating that no location has been determined.

It may be the case that the network resources available in a given location do not match any location profile exactly. For example, in FIG. 1, server 103 may be down. Were this to be the case, given the location profiles of FIG. 4, the score for the office location would be zero and that for the home location would also be zero. The location determination process would then query the user to disambiguate the current location, using the GUI of FIG. 8. If on the other hand, server 103 were to be detected, but printer A to be down in the office, however, the office score would still be zero but the score for the home location profile would be minus two since neither the printer nor the scanner would be present. Given a threshold of zero, the location determination process would correctly identify the computer 100 to be in the office.

The process can be generalized to give more weight to the presence of some resources and to the absence of others. This would be of use in environments where some resources are only occasionally present while others always are. The location profiles can also be generalized to contain two lists of resources per profile, one list listing those resources that are likely to be present and the other list listing those resources that are likely to be absent.

Thus the present invention is capable of determining the location of a computer to a greater or lesser degree of confidence, moreover selecting the likely location of the computer from a list known in advance. The present invention relies on computer resources that are already present in most portable computers rather than on any additional resources dedicated to the location-determination task. Furthermore, the processes of the present invention consume no power other than at the time location is to be determined (unlike dead-reckoning systems which must continuously sample inertial components).

The methods of the present invention relies on the computer being connected to a network, preferably a network connecting the computer only to other network components located in the immediate geographic proximity of the computer. Alternatively, if the computer can determine whether a network component is close or far away (say by the latency between a message to interrogate the component and the arrival of the response, or by the route that such a message takes) this can also be used for the present invention. The present invention determines the identity or type of a set of all resources known to be geographically close and captures this set of identities as a "syndrome." This syndrome is then matched against stored syndromes characteristic of a set of geographic locations. The closes match indicates the current location of the computer. Note that the absence of a resources is as indicative of location as is its presence.

One value of the present invention is that it can be used in virtually all computer environments and has very low or zero incremental cost. It does not depend on an infrastructure devoted to supplying location information, but rather, it infers location from the resource set available at the current location.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system of determining a location of a portable data processing system, the computer implemented method comprising:
    determining a set of resources geographically proximate to the portable data processing system to generate a location syndrome;
    responsive to determining the set of resources geographically proximate to the portable data processing system to generate the location syndrome, comparing the location syndrome to a set of location profiles; and
    responsive to sufficiently matching the location syndrome to one of the set of location profiles, returning, to a software component, a unique location identification label corresponding to a matched one of the set of location profiles as a current location of the portable data processing system, wherein sufficiently matching the location syndrome to one of the set of location profiles comprises providing a set of scores ranging from a highest score to a lowest score, and assigning a score from the set of scores to a location profile in the set of location profiles, wherein the score assigned corresponds to a degree to which the location profile matches the location syndrome.

2. The computer implemented method as recited in claim 1, wherein assigning a score comprises:
    initializing the score, incrementing the score if a resource in a specific resource profile is present, and decrementing the score if the resource in the specific resource profile is not present.

3. The computer implemented method as recited in claim 2, wherein sufficiently matching the location syndrome to one of the set of location profiles further comprises:
    storing a set of unique location identification labels corresponding to the set of location profiles as a set of candidate locations;
    responsive to storing the set of unique location identification labels corresponding to the set of location profiles as the set of candidate locations, eliminating the unique location identification labels in the set of unique location identification labels for the location profile with the lowest assigned score to produce a revised set of candidate locations; and
    identifying a best match from the revised set of candidate locations as the current location of the portable data processing system.

4. The computer implemented method as recited in claim 3, wherein sufficiently matching the location syndrome to one of the set of location profiles further comprises:

responsive to a determination that the assigned score of one of the revised set of candidate locations with the highest assigned score exceeds the assigned score of other ones of the revised set of candidate locations by a specified margin and to a determination that the assigned score of the one of the revised set of candidate locations exceeds a threshold value, identifying the one of the revised set of candidate locations with the highest assigned score as the current location of the portable data processing system.

5. The computer implemented method as recited in claim 3, wherein sufficiently matching the location syndrome to one of the set of location profiles further comprises:

responsive to a determination that the assigned score of one of the revised set of candidate locations with the highest assigned score does not exceed the assigned score of other ones of the revised set of candidate locations by a specified margin and to a determination that the assigned scores of at least some of the other ones of the revised set of candidate locations exceed a threshold value, presenting at least some of the revised set of candidate locations to a user for a user selection of the current location of the portable data processing system.

6. The computer implemented method as recited in claim 1, wherein determining the set of resources geographically proximate to the portable data processing system comprises using a directory-based protocol.

7. The computer implemented method as recited in claim 1, wherein determining the set of resources geographically proximate to the portable data processing system comprises using at least one of a Dynamic Host configuration Protocol and a Service Discovery Protocol.

8. The computer implemented method as recited in claim 1, wherein determining the set of resources geographically proximate to the portable data processing system comprises determining a latency between a message to interrogate a component and an arrival of a response.

9. The computer implemented method as recited in claim 1, wherein determining the set of resources geographically proximate to the portable data processing system comprises determining a route that a message to interrogate a component takes.

10. The computer implemented method as recited in claim 1, wherein the set of resources include a set of behaviors of the data processing system and a proximate network.

11. The computer implemented method as recited in claim 1, wherein after sufficiently matching the location syndrome to more than one of the set of location profiles, presenting a plurality of the set of location profiles to a user for a user selection of the current location of the portable data processing system.

12. A computer program product in a computer readable storage media for use in a portable data processing system for determining a location of the portable data processing system, the computer program product comprising:

determining instructions for determining a set of resources geographically proximate to the portable data processing system to generate a location syndrome;

responsive to determining the set of resources geographically proximate to the portable data processing system to generate the location syndrome, comparing instructions for comparing the location syndrome to a set of location profiles; and matching instructions, responsive to sufficiently matching the location syndrome to one of the set of location profiles, for returning, to a software component, a unique location identification label corresponding to a matched one of the set of location profiles as a current location of the portable data processing system, wherein sufficiently matching the location syndrome to one of the set of location profiles comprises providing instructions for providing a set of scores ranging from a highest score to a lowest score, and assigning instructions for assigning a score from the set of scores to a location profile in the set of location profiles, wherein the score assigned corresponds to a degree to which the location profile matches the location syndrome.

13. The computer program product as recited in claim 12, wherein the assigning instructions for assigning a score comprises:

instructions for initializing the score, incrementing the score if a resource in a specific resource profile is present, and decrementing the score if the resource in the specific resource profile is not present.

14. The computer program product as recited in claim 13, wherein sufficiently matching the location syndrome to one of the set of location profiles further comprises:

storing instructions for storing a set of unique location identification labels corresponding to the set of location profiles as a set of candidate locations;

responsive to storing the set of unique location identification labels corresponding to the set of location profiles as the set of candidate locations, elimination instructions for eliminating the unique location identification label in the set of unique location identification labels for the location profile with the lowest assigned score to produce a revised set of candidate locations; and identifying instructions for identifying a best match from the revised set of candidate locations as the current location of the portable data processing system.

15. The computer program product as recited in claim 14, wherein the identifying instructions are first identifying instructions and wherein sufficiently matching the location syndrome to one of the set of location profiles further comprises:

second identifying instructions, responsive to a determination that the assigned score of one of the revised set of candidate locations with the highest assigned score exceeds the assigned score of other ones of the revised set of candidate locations by a specified margin and to a determination that the assigned score of the one of the revised set of candidate locations exceeds a threshold value, for identifying the one of the revised set of candidate locations with the highest assigned score as the current location of the portable data processing system.

16. The computer program product as recited in claim 14, wherein sufficiently matching the location syndrome to one of the set of location profiles further comprises:

presenting instructions, responsive to a determination that the assigned score of one of the revised set of candidate locations with the highest assigned score does not exceed the assigned score of other ones of the revised set of candidate locations by a specified margin and to a determination that the assigned score of at least same of the other ones of the revised set of candidate locations exceed a threshold value, presenting at least some of the revised set of candidate locations to a user for a user selection of the current location of the portable data processing system.

17. The computer program product as recited in claim 12, wherein determining the set of resources geographically proximate to the portable data processing system comprises using a directory-based protocol.

18. The computer program product as recited in claim 12, wherein determining the set of resources geographically proximate to the portable data processing system comprises using at least one of a Dynamic Host configuration Protocol and a Service Discovery Protocol.

19. The computer program product us recited in claim 12, wherein determining the set of resources geographically proximate to the portable data processing system comprises determining a latency between a message to interrogate a component and an arrival of a response.

20. The computer program product as recited in claim 12, wherein determining the set of resources geographically proximate to the portable data processing system comprises determining a route that a message to interrogate a component takes.

21. The computer program product as recited in claim 12, wherein the set of resources include a set of behaviors of the data processing system and a proximate network.

22. A data processing system for determining a location of a portable data processing system, the data processing system comprising:
    a location syndrome generator which determines a set of resources geographically proximate to the portable data processing system to generate a location syndrome;
    a comparator which, responsive to determining the set of resources geographically proximate to the portable data processing system to generate the location syndrome, compares the location syndrome to a set of location profiles;
    a mechanism for determining whether the location syndrome sufficiently matches one of the set of location profiles, the mechanism comprising:
    a provider which provides a set of scores ranging from a highest score to a lowest score, and
    an assigner which assigns a score from the set of scores to a location profile in the set of location profiles, wherein the score assigned corresponds to a degree to which the location profile matches the location syndrome; and
    a matcher which, responsive to sufficiently matching the location syndrome to one of the set of location profiles, returns, to a software component, a unique location identification label corresponding to a matched one of the set of location profiles as a current location of the portable data processing system.

23. The data processing system as recited in claim 22, wherein assigning a score comprises initializing the score, incrementing the score if a resource in a specific resource profile is present, and decrementing the score if the resource in the specific resource profile is not present.

24. The data processing system as recited in claim 23, wherein the mechanism for determining whether the location syndrome sufficiently matches one of the set of location profiles further comprises:
    a storage unit which stores a set of unique location identification labels corresponding to the set of location profiles as a set of candidate locations;
    responsive to storing the set of unique location identification labels corresponding to the set of location profiles as the set of candidate locations, an eliminator which eliminates the unique location identification label in the set of unique location identification labels for the location profiles with the lowest assigned score to produce a revised set of candidate locations; and
    an identifier which identifies a best match from the revised set of candidate locations as the current location of the portable data processing system.

25. The data processing system as recited in claim 24, wherein the identifier comprises a first identifier and wherein sufficiently matching the location syndrome to one of the set of location profiles further comprises:
    a second identifier which, responsive to a determination tat the assigned score of one of the revised set of candidate locations with the highest assigned score exceeds the assigned score of other ones of the revised set of candidate locations by a specified margin and to a determination that the assigned score of the one of the revised set of candidate locations exceeds a threshold value, identifies the one of the revised set of candidate locations with the highest assigned score as the current location of the portable data processing system.

26. The data processing system as recited in claim 24, wherein the mechanism for determining whether the location syndrome sufficiently matches one of the set of location profiles further comprises:
    a presentation unit which, responsive to a determination that the assigned score of one of the revised set of candidate locations with the highest assigned score does not exceed the assigned score of other ones of the revised set of candidate locations by a specified margin and to a determination that the assigned scores of at least some of the other ones of the revised set of candidate locations exceed a threshold value, presents at least some of the revised set of candidate locations to a user for a user selection of the current location of the portable data processing system.

27. The data processing system as recited in claim 22, wherein determining the set of resources geographically proximate to the portable data processing system comprises using at least one of a Dynamic Host configuration Protocol and a Service Discovery Protocol.

28. The data processing system as recited in claim 22, wherein determining the set of resources geographically proximate to the portable data processing system comprises determining a latency between a message to interrogate a component and an arrival of a response.

29. The data processing system as recited in claim 22, wherein determining the set of resources geographically proximate to the portable data processing system comprises determining a route that a message to interrogate a component takes.

30. The data processing system as recited in claim 22, wherein:
    the location syndrome generator determines a set of behaviors of the data processing system and a proximate network; and
    a location profile in the set of location profiles includes a list of behaviors of the data processing system and the proximate network present at a set of locations for which the location profile is available.

* * * * *